United States Patent
Beachem et al.

(10) Patent No.: US 9,154,299 B2
(45) Date of Patent: Oct. 6, 2015

(54) REMOTE MANAGEMENT OF ENDPOINT COMPUTING DEVICE WITH FULL DISK ENCRYPTION

(75) Inventors: Brent R. Beachem, Riverton, UT (US); Merrill K. Smith, Riverton, UT (US)

(73) Assignee: Novell, Inc., Provo, UT (US)

( * ) Notice: Subject to any disclaimer, the term of this patent is extended or adjusted under 35 U.S.C. 154(b) by 864 days.

(21) Appl. No.: 12/966,421

(22) Filed: Dec. 13, 2010

(65) Prior Publication Data

US 2012/0151200 A1    Jun. 14, 2012

(51) Int. Cl.
H04L 29/06      (2006.01)
H04L 9/08       (2006.01)

(52) U.S. Cl.
CPC .................. H04L 9/0894 (2013.01)

(58) Field of Classification Search
CPC . G06F 21/575; G06F 11/1417; G06F 9/4406; H04L 9/0894
See application file for complete search history.

(56) References Cited

U.S. PATENT DOCUMENTS

| | | |
|---|---|---|
| 6,327,660 B1 | 12/2001 | Patel |
| 6,996,706 B1 | 2/2006 | Madden et al. |
| 7,165,170 B2 | 1/2007 | Rothman et al. |
| 7,206,931 B2 | 4/2007 | Zimmer et al. |
| 7,237,102 B2 | 6/2007 | Rothman |
| 7,243,224 B2 | 7/2007 | Nair et al. |
| 7,257,704 B2 | 8/2007 | O'Neal |
| 7,320,052 B2 | 1/2008 | Zimmer et al. |
| 7,412,595 B2 | 8/2008 | Velhal et al. |
| 7,448,030 B2 | 11/2008 | Lin et al. |
| 2002/0171546 A1 | 11/2002 | Evans et al. |
| 2003/0018865 A1* | 1/2003 | Page ............................ 711/163 |
| 2005/0166213 A1 | 7/2005 | Cromer et al. |
| 2006/0005034 A1* | 1/2006 | Willman et al. .............. 713/182 |
| 2006/0161784 A1 | 7/2006 | Hunter et al. |
| 2006/0161790 A1 | 7/2006 | Hunter et al. |

(Continued)

FOREIGN PATENT DOCUMENTS

EP    1 895 442 A2    3/2008
EP    1 970 829 A1    9/2008

(Continued)

OTHER PUBLICATIONS

"SafeBoot 5 Device Encryption Adminstrators Guide," SafeBoot N.V. 2007.*

(Continued)

Primary Examiner — Shewaye Gelagay
Assistant Examiner — Kendall Dolly
(74) Attorney, Agent, or Firm — Schwegman Lundberg & Woessner, P.A.

(57) ABSTRACT

Methods and apparatus involve protecting data encrypted by a first key on an endpoint computing asset including a drive with full disk encryption. The endpoint has both a main operating system for applications, and the like, and another operating system during a pre-boot phase of operation. During use, the pre-boot operating system prevents a user of the endpoint from accessing the encrypted data and the key. In one embodiment, an information exchange partition on the endpoint is accessible from a remote location and includes data encrypted using a second key accessible to both the pre-boot operating system and the main operating system. Another embodiment allows for the provision of a network connection to the endpoint during the pre-boot phase of operation in accordance with a security policy.

16 Claims, 6 Drawing Sheets

(56) References Cited

U.S. PATENT DOCUMENTS

| | | | |
|---|---|---|---|
| 2007/0198819 A1 | 8/2007 | Dickens et al. | |
| 2007/0266120 A1 | 11/2007 | Tallieu et al. | |
| 2007/0294520 A1 | 12/2007 | Leigh et al. | |
| 2008/0147830 A1 | 6/2008 | Ridgill et al. | |
| 2009/0319806 A1 | 12/2009 | Smith et al. | |
| 2010/0023782 A1 | 1/2010 | Prakash et al. | |
| 2010/0250959 A1 | 9/2010 | Challener et al. | |
| 2011/0107074 A1* | 5/2011 | Chan et al. | 713/2 |

FOREIGN PATENT DOCUMENTS

| | | |
|---|---|---|
| GB | 2 453 230 | 4/2009 |
| WO | WO 03/067435 A2 | 8/2003 |
| WO | WO 03/090053 A1 | 10/2003 |
| WO | WO 2007/111660 A2 | 10/2007 |

OTHER PUBLICATIONS

Preboot Execution Environment (PXE) Specification, Version 2.1, Sep. 20, 1999, Intel Corporation, 103 pages.

Intel vPro Technology for Notebook and Desktop PCs, (undated), Intel Corporation, http://www.intel.com/technology/vpro/index.htm, 2 pages.

Preboot Execution Environment, Updated Aug. 14, 2008, Wikipedia, http://en.wikipedia.org/wiki/Preboot_Execution_Environment, 5 pages.

http://en.wikipedia.org/wiki/Full_Disk_Encryption; "Full disk encryption"; Last modified May 2, 2009; 5 Pages.

http://en.wikipedia.org/wiki/Trusted_Platform_Module; "Trusted Platform Module"; Last modified May 6, 2009; 4 Pages.

http://en.wikipedia.org/wiki/File:TPM_english.svg; File:TPM english.svg; Printed May 20, 2009; 3 Pages.

http://en.wikipedia.org/wiki/Intel_vPro; "Intel vPro"; last modified Apr. 12, 2009; 8 Pages.

http://securosis.com/blog/firestarter-is-full-disk-encryption-without-pre-boot-secure/FireStarter: Is Full Disk Encryption without Pre-Boot Secure? Printed Dec. 10, 2010 5 Pages.

http://www.safenet-inc.com/uploadedFiles/About_SafeNet/Resource_Library/Resource_Items/Product_Briefs_-_EDP/SafeNet_product_brief_GOLD.pdf SafeNet GOLD Authentication Product Brief Printed Dec. 10, 2010 2 Pages.

http://www.checkpoint.com/products/datasecurity/pc/Check Point Full Disk Encryption Pritned Dec. 10, 2010 4 Pages.

http://www.guardianedge.com/products/guardianedge-hard-disk-encryption.php Guardianedge Hard Disk Encryption Printed Dec. 10, 2010 6 Pages.

http://www.wave.com/products/eras.asp EMBASSY® Remote Administration Server Remote Management for Encrypted Hard Drives and Trusted Platform Modules Printed Dec. 10, 2010 3 Pages.

* cited by examiner

REMOTE MANAGEMENT OF ENDPOINT COMPUTING DEVICE WITH FULL DISK ENCRYPTION

FIELD OF THE INVENTION

Generally, the present invention relates to computing devices and computing environments involving endpoint assets, such as laptops, PDAs, phones, etc. for an enterprise or other entity. Particularly, although not exclusively, it relates to providing remote management and provisioning for an endpoint having full disk encryption. Other features contemplate computing arrangements, computing architecture and computer program products, to name a few.

BACKGROUND OF THE INVENTION

Corporate computing assets, such as laptops, phones, PDAs, etc., are utilized outside corporate firewalls today more than before. With ever more employees either working from home or "on the road," controlling and managing corporate information technology (IT) assets is becoming a difficult or serious problem. It is especially complicated when assets are lost or stolen which can compromise corporate data stored on the device.

Full disk encryption (FDE) is one technique to combat the loss of data on a lost or stolen device. Typically, FDE is employed on a drive using a pre-boot authentication (PBA) partition, and the system boots to that partition and seeks proper authentication, such as a password or certificate (which may be on a removable storage device). Once provided, the drive employing FDE may be decrypted and the main operating system employed to boot to this drive.

This PBA process requires a person to be physically present at the machine in order to provide the authentication. This prohibits a remote connection from being made, such as for allowing access by IT people desiring to provide software updates to the device, and is a major deterrent to the use of FDE. Additionally, deploying software on the FDE drive may require a reboot, which cannot be done unless a person is physically present to provide the required authentication.

Accordingly, a need exists for a manner in which to manage and provision a drive employing FDE from a remote location.

SUMMARY OF THE INVENTION

The foregoing and other problems become solved by applying the principles and teachings associated with the hereinafter-described methods and apparatus. At a high level, embodiments involve protecting encrypted data of endpoint computing assets (e.g., laptop, PDA, phone, etc.). The endpoint has both a main operating system for loading and utilizing computing applications, as is typical, and another, secure operating system during a pre-boot phase of operation that prevents users of the endpoint from accessing the encrypted data and the key.

One aspect of the disclosure relates to a method of providing remote management of a fully encrypted drive including data encrypted by a first key on an endpoint computing device in a computing system environment. The drive includes a pre-boot operating system that prevents a user of the endpoint from accessing the encrypted data and a main operating system. The method comprises providing an information exchange partition associated with the endpoint computing device accessible from a remote location, said information exchange partition including data encrypted using a second key accessible to the pre-boot operating system and the main operating system.

The method may further include the step of providing the data encrypted using the second key from the remote location. Also, the method may include the steps of providing the information exchange partition with an instruction for requiring authentication (e.g., a credential from a remote user) for accessing the main operating system and, upon reboot, causing the pre-boot operating system to read the instruction and request the credential. In case, the method may also prevent the pre-boot operating system from reading the instruction during a subsequent reboot of the endpoint computing device, and further may, upon reboot, perform the step of allowing the main operating system to access the data encrypted using the second key (which may involve only partially decrypting the data encrypted using the first key). Preferably the data encrypted using the second key comprises software for updating the main operating system, and performs the step of rebooting the endpoint computing device upon completion of the update.

Another aspect of the disclosure relates to an endpoint computing device including a hardware platform including a processor, memory and a disk. First encrypted data is configured for storage in the memory or disk, and a first key is stored on the hardware platform to decrypt the first encrypted data. An information exchange partition on the hardware platform includes second encrypted data, and a second key is stored on the hardware platform to decrypt the second encrypted data. A policy enforcement module on the hardware platform carries out predefined security policies between the key and the encrypted data. A computer operating system and a pre-boot operating system configured to act on the processor such that upon launching a pre-boot phase of operation, which prevents a user of the endpoint computing device from accessing at least the first encrypted data. The computer operating system and the pre-boot operating system share access to the second key for decrypting the second encrypted data on the information exchange partition.

Preferably, the information exchange partition and the pre-boot operating system reside on the disk of the hardware platform. The information exchange partition may include an instruction for allowing one-time authentication from a remote location according to a specified credential during the pre-boot phase of operation. The information exchange partition may also include software for updating the main operating system.

A further aspect of the disclosure relates to a computer program product for loading on an endpoint computing device to manage an endpoint computing device including full disk encryption using a first key. The computer program product includes executable instructions that launch a pre-boot phase of operation during which time a pre-boot operating system of the endpoint prevents a user of the endpoint from accessing the encrypted data. The executable instructions are further configured to access an information exchange partition on the endpoint computing device. The information exchange partition includes data encrypted using a second key accessible to both the pre-boot operating system and the main operating system.

The instructions may allow for one-time authentication according to a specified credential during the pre-boot phase of operation. In the case that the information exchange partition includes software for updating the main operating system, the instructions are configured to run the software. The instructions may also be configured to reboot the endpoint computing device after running the software.

Still a further aspect of the disclosure relates to a method of providing remote management for a fully encrypted drive on an endpoint computing device including a pre-boot operating system that provides a pre-boot phase of operation that prevents a user of the endpoint computing device from accessing encrypted data on the fully encrypted drive. The method comprises providing a network connection to the endpoint during the pre-boot phase of operation in accordance with a security policy.

The method may further include the step of authenticating the endpoint computing device back to a networked server in the computing system environment in accordance with the security policy and, upon authentication, providing access to the fully encrypted drive. Likewise, the method may involve providing the security policy to the endpoint computing device from a networked computing device in the computing system environment.

Another related aspect of the disclosure is an endpoint computing device, comprising a hardware platform including a processor, memory and disk; encrypted data configured for storage in the memory or disk; a first key stored on the hardware platform to decrypt the first encrypted data; and a policy enforcement module on the hardware platform to carry out at least one predefined security policy. The device further includes a computer operating system and a pre-boot operating system configured to act on the processor such that upon launching a pre-boot phase of operation, the policy enforcement module requires the pre-boot operating system to prevent a user of the endpoint from accessing the encrypted data, and wherein the pre-boot operating system is configured to provide a network connection to a server networked to the endpoint computing device during the pre-boot phase of operation in accordance with the at least one predefined security policy.

Yet another aspect of the disclosure is a computer program product for loading on an endpoint computing device to provide remote access to a drive including full disk encryption. The computer program product includes executable instructions that launch a pre-boot phase of operation during which time a pre-boot operating system of the endpoint prevents a user of the endpoint from accessing the encrypted data, the executable instructions configured to provide a network connection to a server networked to the endpoint in a computing system environment during the pre-boot phase of operation in accordance with a security policy.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for protecting encrypted data of endpoint computing assets, especially by way of managing keys that decrypt the data including the use of a secure, pre-boot operating system.

As used herein, the "pre-boot" is a phase of operation commonly referred to as the initialization and configuration by the Basic Input Output System (BIOS). Its time is generally defined by firmware that runs between a processor reset (oftentimes occurring at Power On or during a Restart) and the first instruction of the loader for the traditional or main Operating System (OS). Thereafter, the start of the OS load begins the period commonly referred to as OS runtime. During OS runtime, the firmware acts as an interface between software and hardware components of a computer system. As computer systems have become more sophisticated, the operational environment between the OS level and the hardware level is generally referred to as the firmware or the firmware environment.

Figure 1:
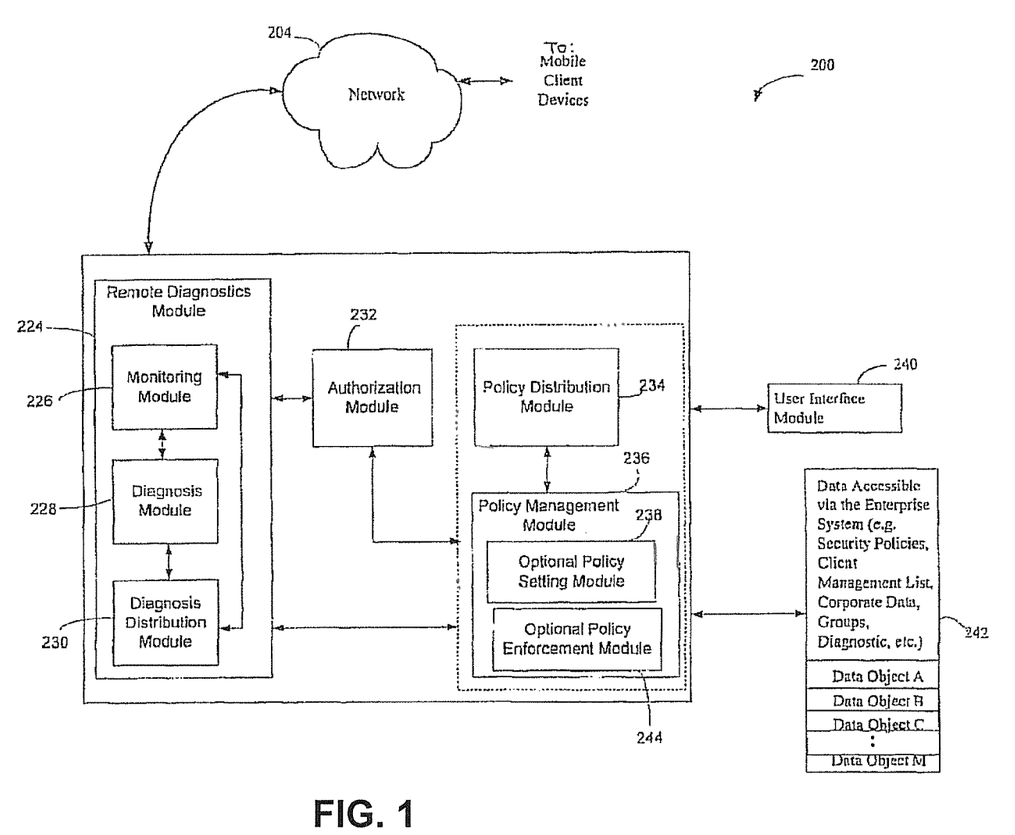
FIGS. 1 and 2 are diagrammatic views of opposite ends of the representative computing environment illustrating computing devices as a host and client.

With reference to FIG. 1, a representative illustration of a computer system 200 (FIG. 2) acting in a host/server role with respect to an endpoint asset in the form of a mobile, laptop 201 (FIG. 3) acting in a client role. Similarly, FIGS. 1 and 2 also illustrate interaction between the server computer system 200 and the client 201 for the purpose of protecting encrypted data of the endpoint, especially by way of a pre-boot, secure operating system.

In this regard, the system 200 may be implemented as software executing in a standalone computer having a processor being accessible to memory, the processor being communicatively coupled with one or more network interfaces, a display and input/output devices such as a keyboard and a pointing device. Similarly, the system 200 may be implemented by a series of networked computers as may be typically implemented by an enterprise. Additionally, the system 200 in FIG. 1 may also be implemented in another mobile computing device. As is typical, the server or server-side system 200 may be arranged to allow an administrator to manage and distribute policies and software upgrades, analyze logs, and perform remote diagnostics. Similarly, the client system 201 in FIG. 2 may be implemented as software executing in a mobile computing device having a processor being accessible to memory, the processor being communicatively coupled with one or more network interfaces, a display and input/output devices such as a keyboard and a pointing device. The client side system 201 also monitors the user's changes in location and/or security features and applies the appropriate policies automatically as the user moves about or as different security features are activated or deactivated. The client 201 enforces the policies set up by the administrator, and performs diagnostics. The client 201 can also create and manage policies for the client mobile device when run in a self-managed mode.

In more detail, FIG. 1 illustrates a system 200 having an authorization module 232, a policy distribution module 234, a policy management module 236, illustrated here with an optional policy setting module 238 and an optional policy enforcement module 244, a remote diagnostics module 224 and a user interface module 240.

The policy management module 236 manages security policies. One aspect of managing security policies is defining the policies. In this example, the policy management module 236 comprises instructions for establishing a pre-defined criteria based upon user input processed by the communicatively coupled user interface module 240 and a memory module 242. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

Connected to the policy management module is the policy distribution module 234. Its function is to distribute security information to the one or more client mobile devices 201. Examples of security information are versions of existing policies, updated policies, software, or the like.

Connected to the policy management module is the authorization module 232. It functions to authorize a communication exchange between the client mobile device and the policy distribution or policy management modules (which, representatively, will be seen during the pre-boot phase of operation). Primarily, it is a further safeguard against unauthorized or rogue mobile devices trying to hijack the security policies or corporate data of the endpoint device. In this regard, various authorization protocols and techniques may be used. One example is a simple username and password verification scheme. Another example is a cryptographic authentication protocol. The authorization module 232 may also be used to authorize a communication exchange between the client system 201 and the remote diagnostics module 224.

In the remote diagnostics module 224, concern is concentrated on the security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. To accomplish this, the remote diagnostics module 224 has a communication interface with each of the user interface module 240, the authorization module 232, the policy management module 236 and the policy distribution module 234. Ultimately, this allows a person using the mobile device to get the device repaired where they are as opposed to having to mail the device or wait until he or she is back in the office to get help.

Also, the remote diagnostics module 224 comprises three sub-modules: a monitoring module 226, a diagnosis module 228, and a diagnosis distribution module 230. The monitoring module 226 receives diagnostic information such as events or audit logs from a client device and stores the information in a data object (242) for the client device. In one embodiment, a client diagnostics module (e.g. FIG. 2, 246) periodically and automatically initiates tests (as part of the pre-boot or at other times). Results including errors from these tests are reported over a network 204 (e.g. Internet) to the remote diagnostics module 224. Other examples of diagnostic information retrieved from the client are debug output files, examples of which include system event logs, crash dumps, and diagnostic outputs from a client diagnostics module (e.g. 246, FIG. 2). This information may be received periodically over a network 204 from the client diagnostics module 246, or upon an initial network connection by the mobile device with the server, because the client diagnostics module 246 requests diagnostic assistance, or at other times.

The diagnosis module 228 analyzes diagnostic information stored for the mobile device. For example, the diagnosis module 228 may perform analysis according to pre-stored diagnostic programs, according to an interactive user environment, a combination of the two, or other. The diagnosis module 228 may actually provide a repair to a problem in the client device, determine that a trend is occurring for the device, or determine that preventive maintenance is to be scheduled for the client device. In one example, the diagnosis module 228 initiates requests to the client mobile device for additional information. The additional information may be based on input received via the user interface module 240 or according to a pre-stored diagnosis method. In one embodiment, the diagnosis module 228 provides requested information to the user interface module 240 responsive to user input. In another embodiment, the diagnosis module 228 may provide requested information transmitted via the diagnostics distribution module 230 over the network 204 to the client mobile device responsive to requests received at a user interface module on the client device (e.g., FIG. 2, 218).

In any event, once a diagnosis has been made with respect to a problem, support information may be distributed to the mobile device under the control of the diagnosis distribution module 230. As contemplated, "support information" may be in the form of instructions or code to the client device to repair a problem or perform maintenance. This provides an advantage of taking corrective or preventive actions without requiring user intervention or action. In another form, "support information" may be forwarded as messages for display by the client device in providing a diagnostic report or requesting specific input from a user of the device. Naturally, either or both of the monitoring module 226 or the diagnosis module 228 may initiate tests and/or queries to determine the readiness or robustness of the existing client device population. Trends may be noted. Again, these tests may be run during a connection with a device without requiring user intervention.

In still other embodiments, the remote diagnostics module 224 may also probe a particular client to verify its status. For example, client configuration information may be retrieved such as the current version of the security policy software components on the client device, the current policy settings on the device, and attributes in accordance with those settings, for example, which ports are blocked. This information may be stored for later assistance in a diagnostics situation or for use with a current diagnostics situation.

Figure 2:
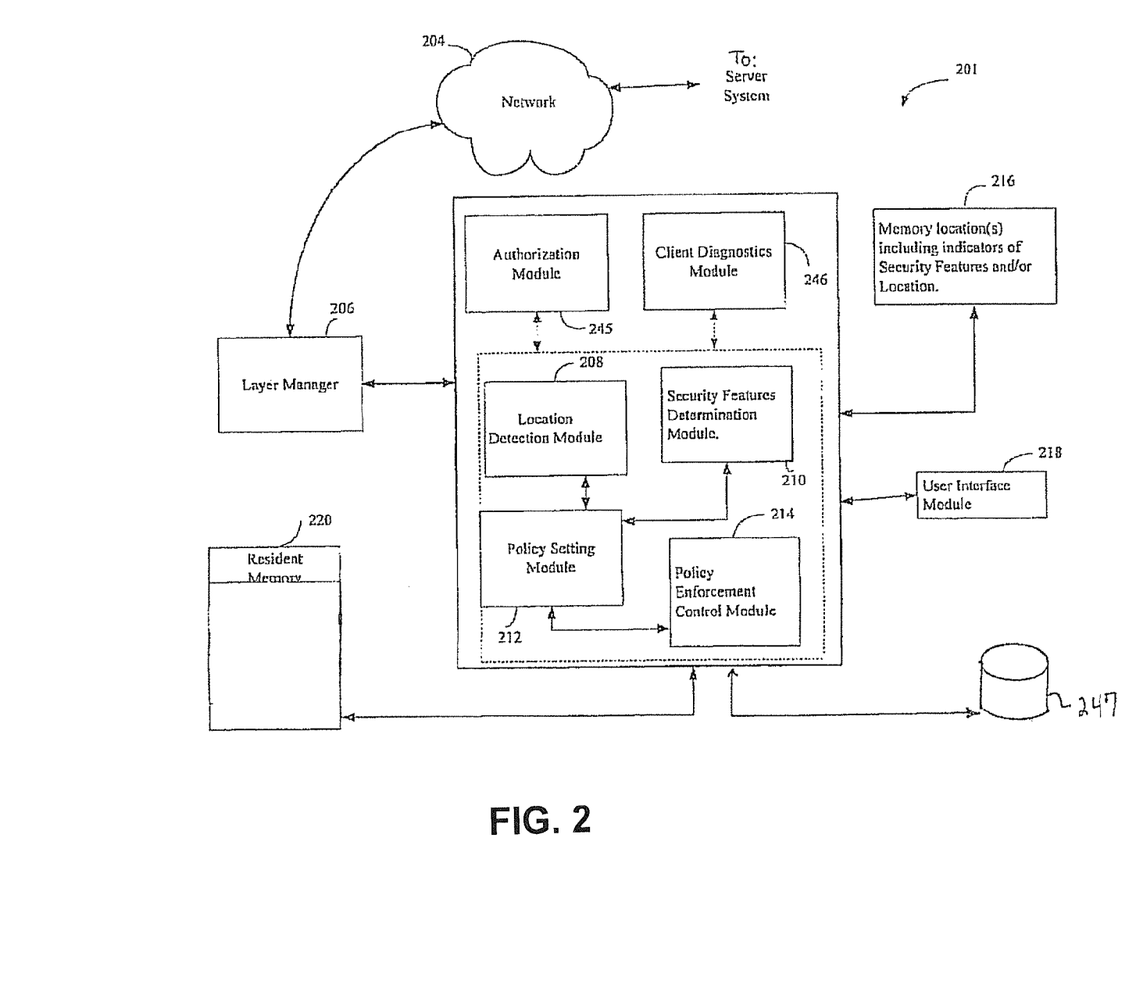

With reference to FIG. 2, the client 201 as illustrated includes a location detection module 208, a policy setting module 212, security features determination module 210, a policy enforcement control module 214, a layer manager 206, a user interface module 218, particular memory location(s) 216 in an otherwise attendant memory 220 (ROM, RAM, etc.), an authorization module 245, a client diagnostics module 246, and access to remote or local storage 247, e.g., disk.

In more detail, the authorization module 245 is configured to provide authorization information to the authorization module 232 of the server system 200 to establish communication exchanges with the client mobile device for the exchange of security information or diagnostic information or both. The client diagnostics module 246, on the other hand, collects diagnostic information which is sent to the remote diagnostics module 224 of the server system 200.

In the layer manager 206, a communications interface is established to one or more of the other modules 208, 210, 212, 214, 245, 246. In function, the layer manager processes network traffic which may include inbound data (e.g. from 242, FIG. 1) accessible over a network and outbound copies of data objects from resident memory 220. In this embodiment, the layer manager 206 processes information in one or more layers of a model for communications between computers in a network. An example of such a model is the Open Systems Interconnection (OSI) data communications model. As is known, the OSI includes seven layers arranged as: the physical layer, the data-link layer, the network layer, the transport layer, the session layer, the presentation layer, and the application layer. Of course, another example of a model is the layered Internet Protocol stack. In this regard, skilled artisans understand four layers to be arranged as the subnetwork layer, the Internet layer, the transport layer, and the application layer.

In other aspects, a security feature module 210 determines whether one or more security features have an activity status of inactive or active in a communication session between the mobile device and another computer. An example of this is determining whether a connection type to the other computer is wired or wireless. Simply enough, this can be indicated by associating the port over which data is being communicated, e.g., a wireless adapter, a network interface card (NIC), etc. In another example, further details of the connection may be indicated by subdivision into further distinctions (e.g. wireless: 802.11, GPRS, GSM, 3G, etc., or wired: modem, digital subscriber line (DSL), T1 line, etc). In other embodiments, policies may be set based on these items. For example, a different security policy may be applied for different vendor brands of NICs or particular classes (e.g. 802.3, 802.11a, 802.11b, GPRS, GSM) of NICs. Furthermore, different security policies may be assigned based on a type of operating system (Unix, Linux, Windows, Leopard, etc.) employed or the version (e.g., 3.1, 3.2, 3.3) of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or anti-virus software, or intrusion-detection software may be the basis for setting different policies on a particular port, network adapter or data.

Figure 3:
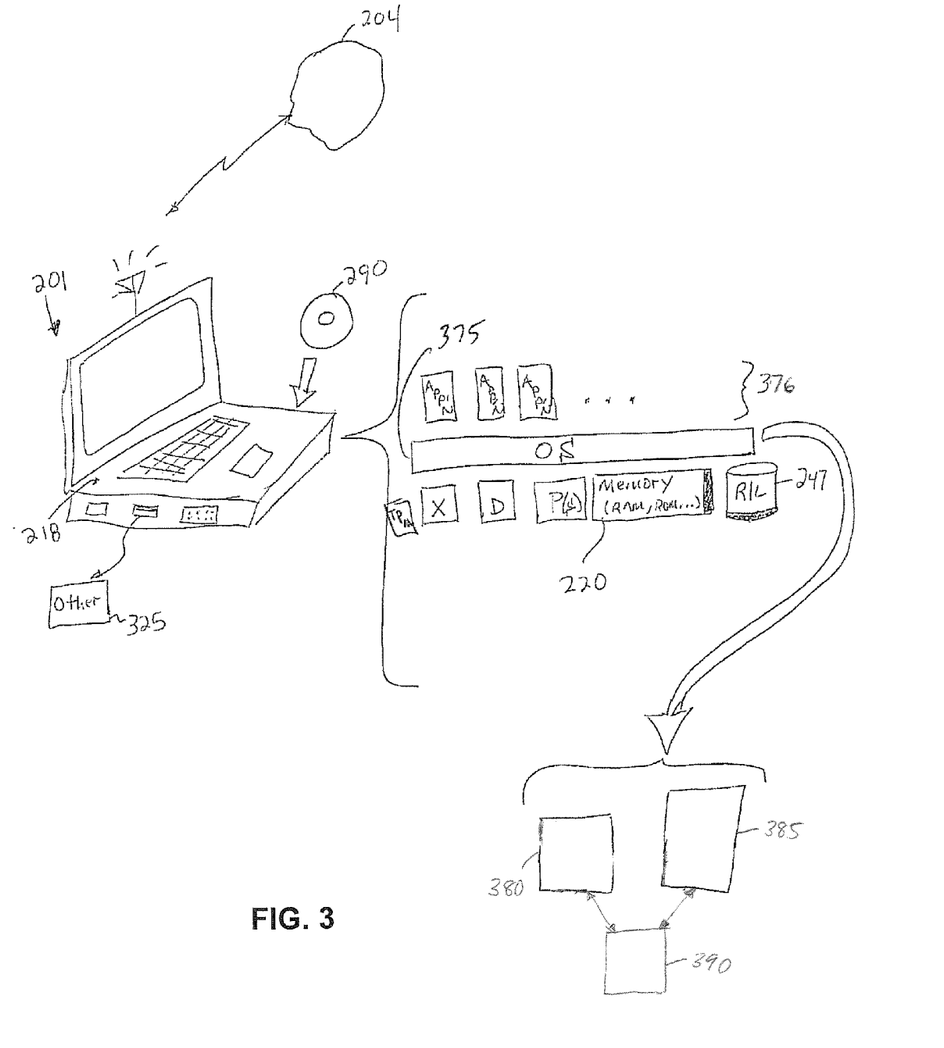
FIG. 3 is a diagrammatic view of a representative endpoint asset in the form of a laptop computing device including a pre-boot operating system.

Leveraging the foregoing, FIG. 3 begins the detailed illustration of the mechanics for actually protecting the encrypted data of the endpoint computing asset (e.g., laptop 201). Preliminarily, however, further tangible items exist on the computing asset, in addition to the modules described in FIG. 2B, such as a hardware platform upon which the firmware, operating system 375 and computing applications 376 are found. As is typical, the hardware platform embodies physical I/O and platform devices, memory (M) 240 (RAM, ROM, etc.), one or more processor(s) (P), such as a CPU, drivers (D), trusted platform module (TPM) chip(s), and interfaces (X) to internal or other items 325, and access to remote or local disk storage 247.

The operating system 375 on the memory 220 and/or storage 247 may comprise a main operating system 380 and a pre-boot operating system 385. The pre-boot operating system 385 may be implemented in conjunction with Full Disk Encryption (FIDE). With reference to U.S. patent application Ser. No. 12/316,466, filed Dec. 12, 2008, and entitled "Pre-Boot Securing of Operating System for Endpoint Evaluation," a more detailed discussion of one example of a pre-boot phase of operation is given as is its capabilities. In that the inventors hereof are the same as the earlier filed application and Novell, Inc., is the common Assignee of both inventions, the earlier '466 application is incorporated herein in its entirety as if set forth entirely herein.

Figure 4:
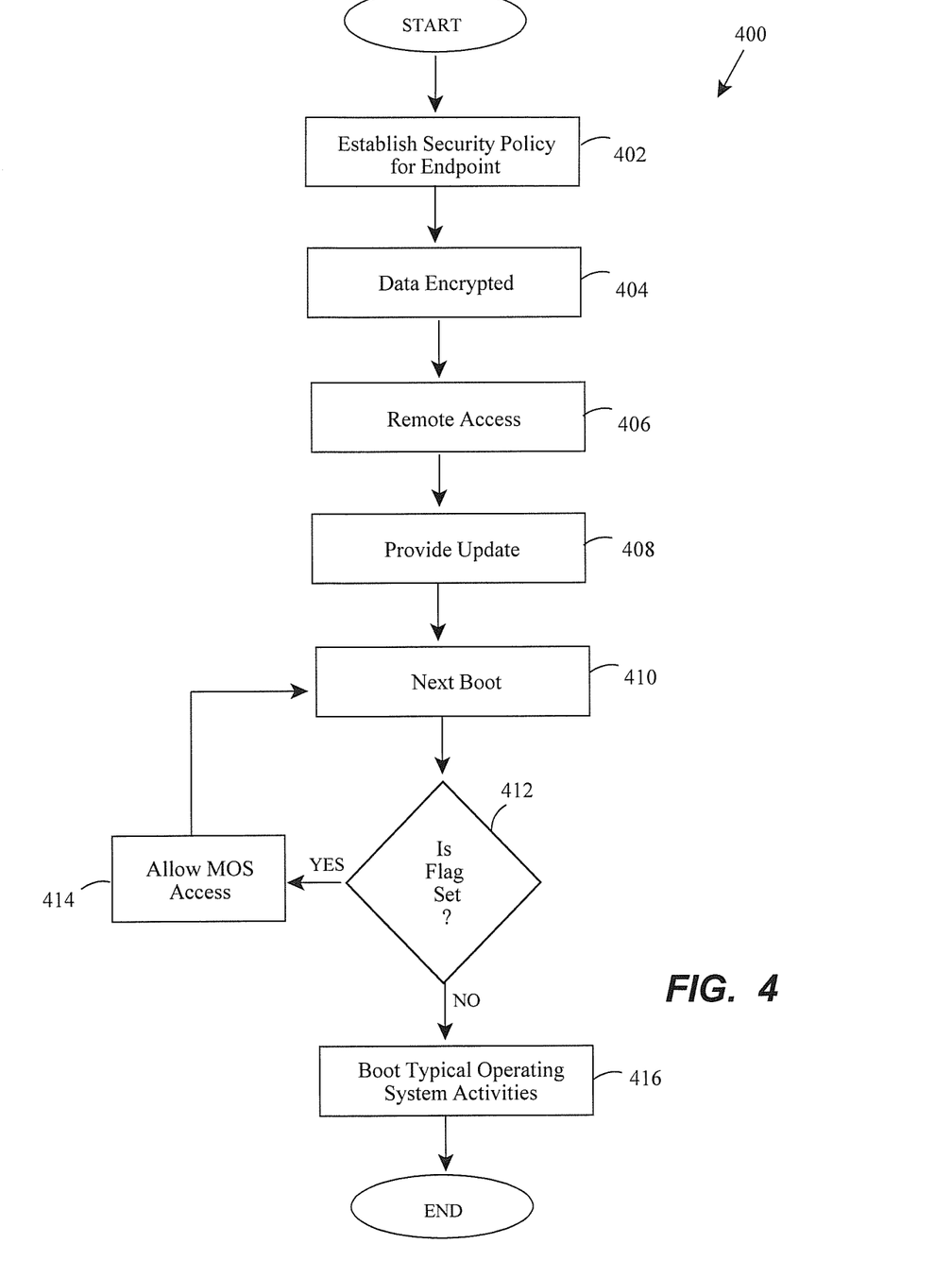
FIG. 4 is a flow chart illustrating one embodiment for allowing the remote management and provisioning of a drive employing full disk encryption.

With reference to FIG. 4, a representative method of protecting encrypted data of an endpoint computing device is given generally as 400. In a first step, 402, a computing policy is established for security of the endpoint computing device. As before (e.g., FIG. 2), this can be based on a variety of criteria, such as a location of the device during use, a connection type, a hardware type of a port and its inherent security settings, an activity status, user input, firewall settings, VPN enforcement, patching applications, device quarantining, (dis)allowing data or executable instructions from removable media or networks, user identity/group, etc. It can also be set and developed per endpoints acting independently, can be foisted upon the endpoint asset from an upstream host (FIG. 1), can be set by a user, etc. It can also be updated over time (including according to certain embodiments of the disclosed inventions).

Once set, however, the endpoint computing device will eventually have all the user data thereon encrypted, step 404, resulting in full disk encryption (FDE). Also, the encrypted data will have a key to allow the user upon authentication in accordance with the set policy to decrypt it in order to decipher the contents of the encryption. During use, the key may be created at the time of data encryption or at other times. It can be created in a public/private key paradigm or with entirely private keys. Also, the key will be stored at some location on the endpoint computing device for later retrieval in times of decryption. In the situation of FDE, it is entirely common to store the key with the TPM (FIG. 3), with flash memory or support memory for where keys are stored for crypto-ASICs. In other situations, however, the key can reside anywhere. The location of key may also be encrypted, in turn, having other keys that first find the whereabouts of the key before the found key can decrypt the data. Of course, other scenarios are possible.

At step 406, the endpoint computing device is being remotely accessed by person other than the user, such as an information technology professional tasked with maintaining the device. In one embodiment, this is achieved by providing an information exchange partition 390 on the endpoint computing device (FIG. 3), such as for example on storage device 247 or otherwise. This exchange partition 390 may include data that is encrypted using a second key different from the key used to encrypt the data on the fully encrypted drive (e.g., storage device 247). The second key is not made accessible by the local user of the endpoint computing device, and is not necessary to decrypt the data encrypted using the first key involved in the FOE process.

As indicated at step 408, the data on the exchange partition 390 may be provided remotely using imaging tools or locally using APIs, in either case while the main operating system 380 is in control and has access to the second key required to store the data to the exchange partition 390. In any case, the remote user by accessing the information exchange partition 390 does not need access to the key associated with the fully encrypted data.

Figure 5:
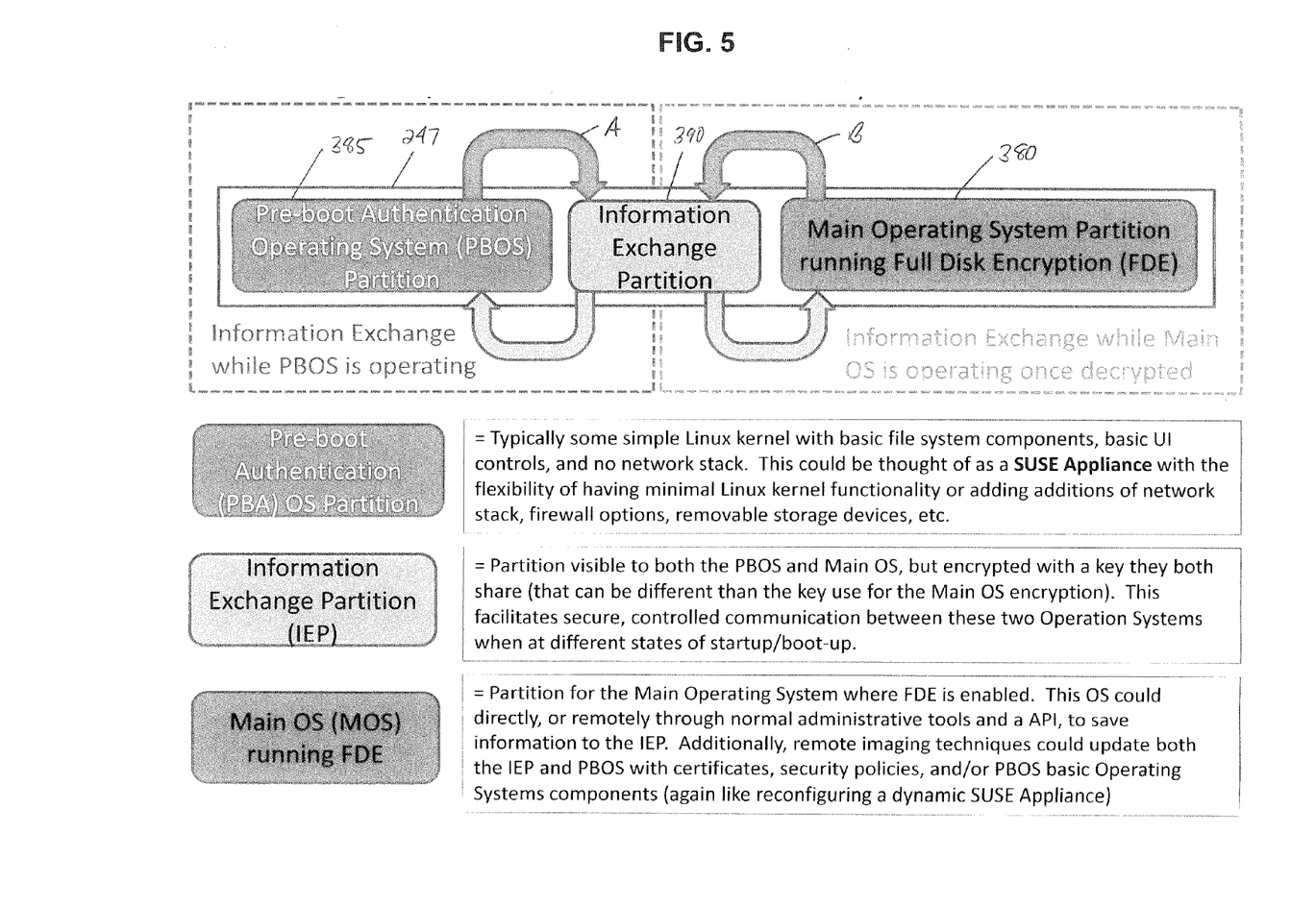
FIG. 5 is a diagrammatic view of the possible interaction between the pre-boot operating system, the information exchange partition, and the main operating system.

As also indicated in FIG. 4, both the main operating system 380 and pre-boot operating system 385 (which may be partitions on the same storage drive 247 that includes the information exchange partition 390, but may also reside at different storage locations) may access the information exchange partition 390, including the second key for decrypting only the data on this partition. Hence, when data (such as a software bundle or path to update the main operating system 380) is loaded onto the information exchange partition 390 and encrypted using the second key, the pre-boot operating system 385 may access the data during the pre-boot phase of operation, despite the presence of the full disk encryption. This is indicated by arrow A in FIG. 5.

At step 410, it is assumed that a subsequent boot of the endpoint computing device takes place. At such subsequent boot, step 410, the pre-boot operating system 385 would access the exchange partition 390. As indicated at step 412, the pre-boot operating system 385 may be provided with an instruction (flag) to assess what work needs to be done to update the main operating system 380. The flag may also be used to provide authentication by requesting a credential, and then verifying the credential (which may be located on the information exchange partition 390).

At step 414, the pre-boot operating system 385 accesses the exchange partition 390, and has access to the key to at least partially decrypt the data to be loaded on the fully encrypted drive (such as, for example, an update to the main operating system 380). This is as indicated by arrow B in FIG. 3. For this purpose, the data on the fully encrypted drive may be decrypted, but preferably this is done only to the extent required to perform the update (e.g., just decrypting the necessary sector or portion of the drive where the patch is required, which may form part of the instructions on the exchange partition 390). The data on the exchange partition 390 may also include an instruction to reboot the endpoint asset once the update process is complete, as indicated by the return to step 410 (but of course step 412 would be bypassed as the instruction or flag is no longer set).

At step 416, the pre-boot operating system 385 securely loads. This initiates again the pre-boot phase of operation, in which user authentication is required to gain access to the fully encrypted drive. On proper authentication, at step 416, the main operating system 380 and typical operations of the computing device are booted, e.g., computing applications for word processing, internet browsers, email, etc.

Figure 6:
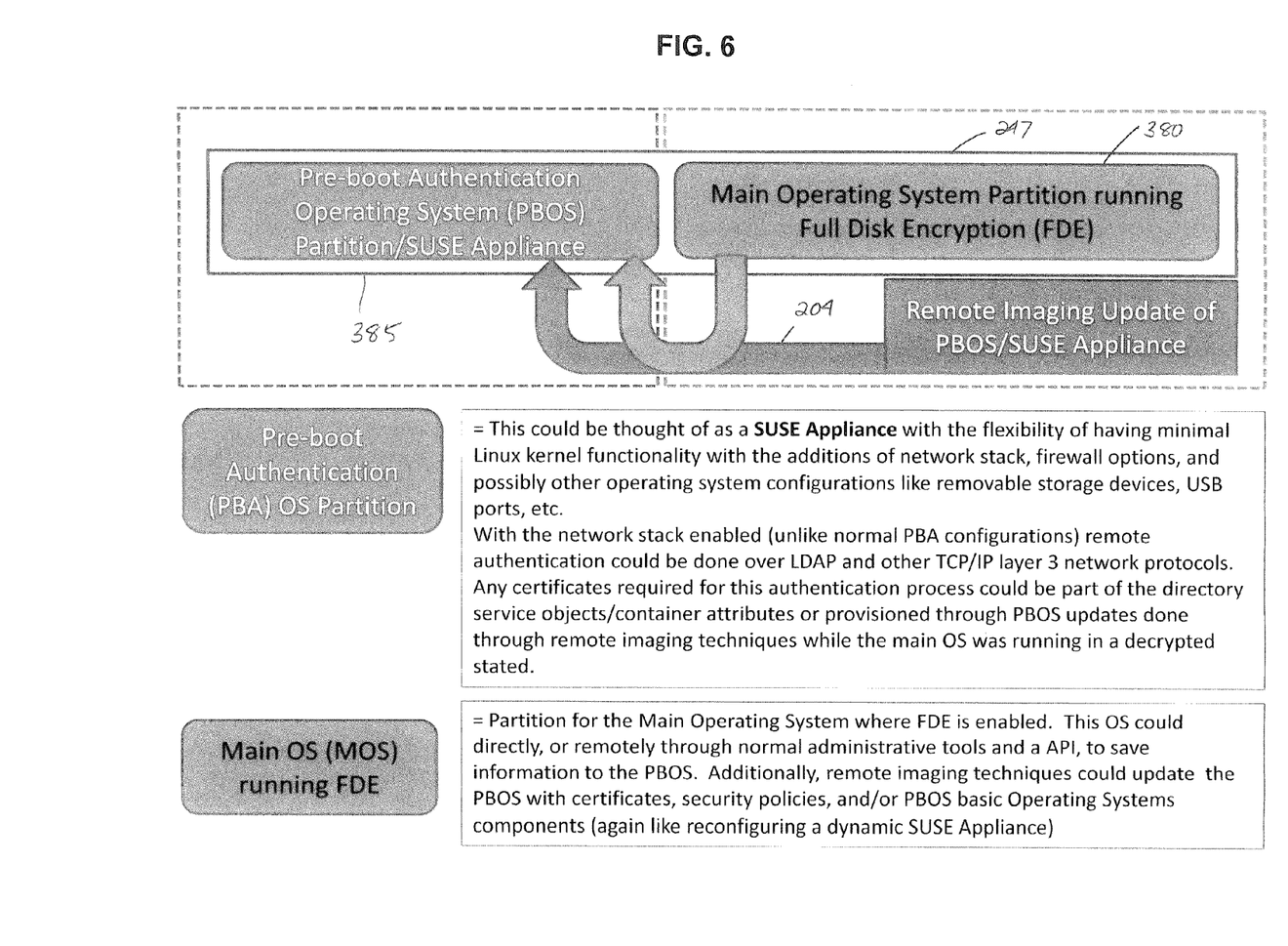
FIG. 6 is a diagrammatic view illustrating another embodiment for allowing the remote management and provisioning of a drive employing full disk encryption.

A second manner of providing remote management and provisioning of full disk encryption on an endpoint computing device is described with reference to FIG. 6. In this embodiment, the secure pre-boot operating system 385 is configured to access a network 204 (such as by providing it with a protocol or network stack) in accordance with the setting of one or more security policies. These security policies govern the provisioning of components of the main operating system 380 and their control, such as for example instructing a firewall program to only allow traffic to certain locations (e.g., a remote imaging server, a software bundles server, an authentication server, etc). In this manner, the authentication may be provided remotely, in accordance with the security policies, and access to the main operating system 380 may be gained over the network 204 from a remote location in accordance with the applicable network protocol (e.g., LDAP and other TCP/IP layer 3 network protocols) despite the presence of the full disk encryption.

Provisioning of the security policy may also be done remotely, for example, while the main operating system 380 is operational and full network access is available (that is, the access is not restricted by the security policy for network access according to the pre-boot operating system 385). This provisioning may involve adjusting the network address of the accessible servers, updating certificates, changing the authentication required during the pre-boot operating phase, or the like. This may also be done locally, such as using imaging APIs. Another option instead of installing certificates would be to store private keys as part of the user's object in the directory service (DS) objects.

In more detail, the following prospective, non-limiting examples provide illustration of the above-described methodologies.

EXAMPLE 1

A patch or software bundle (e.g., an update to anti-virus software) needs to be deployed from a remote location to an endpoint computing device with full disk encryption at another, remote location. Using remote/local imaging techniques or an API in the main operating system 380, the information exchange partition 390 could be updated with: (a) an instruction (flag) that provides for pre-boot authentication with a credential; (b) the credential; and (c) the patch or bundle to be deployed to the main operating system 380.

Upon reboot of subsequent start up of the endpoint asset, the pre-boot operating system 385 would initiate and gain access to the information exchange partition 390 separate from the fully encrypted data. The pre-boot operating system 385 would read the instruction and validate the credential. The pre-boot operating system 385 would then boot the main operating system 380, which would be able to access the information exchange partition 390 to decrypt and run or install the patch or bundle. Once completed, the patch or bundle could cause the endpoint computing device to reboot, initiating again the pre-boot operating system and requiring the user's credential to access the data on the fully encrypted drive and the corresponding key.

EXAMPLE 2

Same as Example 1, but the information exchange partition 390 could be updated simply with an instruction (flag) indicating that there is work to be done in terms of updating the main operating system 380. Upon reboot of subsequent start up of the endpoint asset, the pre-boot operating system 385 would initiate and gain access to the information exchange partition 390 separate from the fully encrypted data. The pre-boot operating system 385 would read the instruction. At the next reboot, the pre-boot operating system 385 decrypts the information exchange partition 390 and installs the software or patch, which may be done by having the pre-boot operating system only decrypt a sector or portion of the drive employing the FDE.

EXAMPLE 3

Same as Example 1, but while the main operating system 380 is running, remote management tools are used to cause an API in the main operating system to write setup information (such as a set of patch files for the main operating system or software running thereon) to the information exchange partition 390. At the next reboot, the pre-boot operating system 385 decrypts the information exchange partition and installs the software or patch, which may be done by having the pre-boot operating system only decrypt a sector or portion of the drive employing the FDE.

EXAMPLE 4

A patch or software bundle needs to be deployed from one location (e.g., work) to an endpoint asset with full disk encryption at another, remote location (e.g., home). Using remote/local imaging techniques or an API in the main operating system 380, the pre-boot operating system 385 is provided with the capability of accessing a network 204. A security policy is updated (locally or remotely) to instruct a firewall program to only allow traffic to or from a specific IP address, such as associated with a remote imaging server, for providing the update to the main operating system 380. At the next reboot, the pre-boot operating system 385 can decrypt the policy and perform according to an instruction (e.g., setup a network stack with a specified firewall). With the pre-boot operating system 385 having a network stack, the endpoint computing device could then be controlled through programs (e.g., Intel VPro or the equivalent) to perform remote diagnostics.

EXAMPLE 5

This example is the same as Example 1, but instead of writing a patch or the like to the information exchange partition 390, a secure network stack is provided to the pre-boot operating system 385 and the patch is downloaded from a remote location. A remote authentication of login would not be required as the pre-boot operating system 385 would access an encrypted policy in the information exchange partition 390, which would include details as to how to configure the network to download data, such as files corresponding to the patch, in a secure manner.

Naturally, many more examples can be imagined by the artisan of ordinary skill in the art and a near endless variety of examples can occur. Implementation of the pre-boot operating system 385 to provide the contemplated access to the information exchange partition 390 or a network 204 may take the form of a SUSE appliance. Also, any of the foregoing embodiments contemplate that the operating system 375 (FIG. 3) and applications 376 could be any of many individual domains in a virtual computing environment. That is, the operating system shown could be a host or guest operating system, (e.g., Linux, Windows, Netware, Unix, etc.), each with its own applications, file systems, etc. An intervening hypervisor layer (not shown), also known as a "virtual machine monitor," or virtualization manager, would exist to interface the domains to the hardware. As is known, the hypervisor is the lowest and most privileged layer and performs scheduling control between the virtual machines as they task the resources of the hardware platform, storage 247, memory (M), etc. The hypervisor also manages conflicts, among other things, caused by operating system access to privileged machine instructions. According to various partitions, the application data, boot data, or other data, executable instructions, etc., of the machines would be virtually stored on the available memory and storage. Also, each domain would have its dedicated, traditional operating system, including a pre-boot operating system that could be dedicated to each domain or common to the entirety of domains. Of course, skilled artisans can readily configure the virtual environment.

In any embodiment, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks 290 (FIG. 3) for insertion in a drive of computing device, or available as downloads or direct use from processor firmware, memory or storage of an upstream computing device. When described in the context of such computer program products, it is denoted that executable instructions thereof, such as those in components, modules, routines, programs, objects, data structures, etc., perform particular tasks or implement particular abstract data types within various structures of the computing system which cause a certain function or group of function, and enable the configuration of the foregoing.

Certain advantages should now also be easily recognized. For instance, the foregoing provides (among other things) the ability to remotely manage and provision an end point computing device employing full disk encryption. This avoids the need for being physically present at the endpoint device in order to provide updates or otherwise perform maintenance that may require a reboot. Also, the possibility of having an FOE drive on an endpoint computing device only partially decrypted to install a patch, without bypassing the normal authentication process and resulting in full decryption of the data.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures. Other modifications include combining the functionality of one or more modules into still other modules having the same functionality. In other words, skilled artisans will understand that the function of the discretely shown modules may be accomplished by lesser or more modules in practice, or modules having different names/identifiers.

The invention claimed is:

1. In a computing system environment, a method of providing remote management of an endpoint computing device employing full disk encryption for data encrypted by a first key, said endpoint computing device including a pre-boot operating system that prevents a user of the endpoint computing device from accessing the encrypted data and a main operating system without providing proper authentication, comprising:

providing an information exchange partition associated with the endpoint computing device accessible from a remote location and authenticated from the remote location via a specified credential during a pre-boot phase, said information exchange partition including data encrypted using a second key, wherein the encrypted data and the second key are accessible to the pre-boot operating system and the main operating system, the second key also used for decrypting the encrypted data; and performing at least one test, without any user action, as part of the pre-boot phase, reporting results for the at least one test over a network to a remote diagnostics module;

probing, by the remote diagnostic module in response to the results, the endpoint computing device for a current version of security policy software components, current settings on the endpoint computing device, and attributes for the settings, wherein at least one setting indicates which particular ports of the endpoint computing device are blocked; and distributing code to repair a diagnosed problem on the endpoint computing device to the endpoint computing device, and executing the code on the endpoint computing device without any particular user interaction or intervention.

2. The method of claim 1, further including the step of providing the data encrypted using the second key from the remote location.

3. The method of claim 1, further including the steps of:
providing the information exchange partition with an instruction for updating the main operating system; and
upon reboot, causing the pre-boot operating system to read the instruction.

4. The method of claim 3, further including the step of preventing the pre-boot operating system from reading the instruction during a subsequent reboot of the endpoint computing device.

5. The method of claim 3, wherein upon reboot, performing the step of providing the main operating system with the data encrypted using the second key.

6. The method of claim 3, wherein upon reboot, performing the step of only partially decrypting the data encrypted using the first key.

7. The method of claim 1, wherein the data encrypted using the second key comprises software for updating the main operating system, and further including the step of rebooting the endpoint computing device upon completion of the update.

8. An endpoint computing device, comprising:
a hardware platform including a processor, memory and a disk;
first encrypted data configured for storage in the memory or disk;
a first key stored on the hardware platform to decrypt the first encrypted data;
an information exchange partition on the hardware platform;
second encrypted data on the information exchange partition;
a second key stored on the hardware platform to decrypt the second encrypted data;
a policy enforcement module on the hardware platform to carry out predefined security policies between the first key and the encrypted data and to authenticate the information exchange platform from a remote location via a specified credential during a pre-boot phase; and
a computer operating system and a pre-boot operating system configured to act on the processor such that upon launching a pre-boot phase of operation, the pre-boot operating system prevents a user of the endpoint computing device from accessing at .least the first encrypted data, and wherein the computer operating system and the pre-boot operating system are provided access to the second key for decrypting the second encrypted data on the information exchange partition, and performing at least one test, without any user action, as part of the pre-boot phase of operation, and reporting results for the at least one test over a network to a remote diagnostics module, and probing, by the remote diagnostic module in response to the results, the endpoint computing device for a current version of security policy software components, current settings on the endpoint computing device, and attributes for the settings, wherein at least one setting indicates which particular ports of the endpoint computing device are blocked; and distributing code to repair a diagnosed problem on the endpoint computing device to the endpoint computing device, and executing the code on the endpoint computing device without interaction or intervention of the user.

9. The device of claim 8, wherein the information exchange partition and the pre-boot operating system reside on the disk of the hardware platform.

10. The device of claim 8, wherein the information exchange partition includes an instruction for updating the main operating system during the pre-boot phase of operation.

11. The device of claim 8, wherein the information exchange partition includes software for updating the main operating system.

12. A method residing as executable instructions in memory or a non-transitory computer-readable storage medium for execution on a computing device and when executed performing the method, comprising:
loading, via the computing device, the executable instructions on an endpoint computing device for managing or provisioning a drive that includes full disk encryption using a first key;
launching, via the computing device, a pre-boot phase of operation during which time a pre-boot operating system of the endpoint prevents a user of the endpoint from accessing the encrypted data;
accessing, via the computing device, an information exchange partition on the endpoint computing device, said information exchange partition including data encrypted using a second key accessible to both the pre-boot operating system and the main operating system and authenticating the information exchange partition from a remote location via a specified credential during a pre-boot phase;
probing, by a remote diagnostic module in response to reported results of a test executed on the endpoint computing device, the endpoint computing device for a current version of security policy software components, current settings on the endpoint computing device, and attributes for the settings, wherein at least one setting indicates which particular ports of the endpoint computing device are blocked; and
distributing code to repair a diagnosed problem on the endpoint computing device to the endpoint computing device, and executing the code on the endpoint computing device without any interaction or intervention of the user.

13. The method of claim 12, wherein the instructions provide for pre-boot authentication according to a specified credential.

14. The method of claim 12, wherein the information exchange partition includes software for updating the main operating system, and the instructions are configured to run the software.

15. The method of claim 14, wherein the instructions are configured to reboot the endpoint computing device after running the software.

16. The method of claim 14, wherein the instructions are configured to only partially decrypt the data on the drive encrypted using the first key.

* * * * *